US012763528B2

(12) United States Patent
Welsh

(10) Patent No.: US 12,763,528 B2
(45) Date of Patent: Oct. 13, 2026

(54) ELECTRICAL CONNECTOR MOUNTING

(71) Applicant: GM GLOBAL TECHNOLOGY OPERATIONS LLC, Detroit, MI (US)

(72) Inventor: Thomas Welsh, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 18/598,205

(22) Filed: Mar. 7, 2024

(65) Prior Publication Data

US 2025/0286331 A1 Sep. 11, 2025

(51) Int. Cl.
*H01R 13/73* (2006.01)

(52) U.S. Cl.
CPC ......... *H01R 13/73* (2013.01); *H01R 2201/26* (2013.01)

(58) Field of Classification Search
None
See application file for complete search history.

(56) References Cited

U.S. PATENT DOCUMENTS 6,478,617 B2 * 11/2002 Fan ...................... H01R 12/707 439/573
7,534,134 B2 * 5/2009 Qiu ........................ H01R 13/73 439/527
7,559,810 B1 * 7/2009 Wu .......................... H01R 4/34 439/709
7,753,320 B2 * 7/2010 Geiger .................. F16B 21/084 248/68.1
7,753,701 B2 * 7/2010 Tsuji .................. H01R 13/4538 439/352
10,808,745 B1 * 10/2020 Javali .................... F16B 21/086

FOREIGN PATENT DOCUMENTS

DE 102004055462 A1 6/2005
DE 102021205760 A1 5/2022
DE 102023122973 A1 8/2024

OTHER PUBLICATIONS

Adams, "Application instructions for USCAR/EWCAP-005 Connector Clip Slot", Revision C, Hellermann Tyton, Mar. 23, 2016, https://uscar.org/wpfd_file/ewcap-005-rev-g-clip-slot-for-7mm-11mm-17mm-and-23mm-clip-slots/, retrieved from U.S. Appl. No. 15/891,321 (Year: 2016).*

(Continued)

*Primary Examiner* — Ross N Gushi
(74) *Attorney, Agent, or Firm* — Ingrassia Fisher & Lorenz, LLP | IFL

(57) ABSTRACT

Electrical interconnections for vehicle, assemblies for electrical interconnections for vehicles, and methods for mounting electrical interconnections to vehicles are provided. An electrical interconnection for a vehicle includes a barbed projection having a proximal end fixed to the vehicle, wherein the projection includes a distal end including outwardly extending barbs; an electrical connector having a selected mounting interface; and a universal connector mount comprising a body formed with a cavity and a corresponding mounting interface, wherein the distal end of the barbed projection is received within the cavity, wherein the barbs pierce the body, and wherein the selected mounting interface of the electrical connector is releasably connected to the corresponding mounting interface of the universal connector mount.

20 Claims, 11 Drawing Sheets

(56) References Cited

OTHER PUBLICATIONS

Adams, "Application instructions for USCAR/EWCAP-005 Connector Clip Slot", Revision G, Hellermann Tyton, Jan. 15, 2024, https://uscar.org/wpfd_file/ewcap-005-rev-g-clip-slot-for-7mm-11mm-17mm-and-23mm-clip-slots/ (Year: 2024).*

USCAR/EWCAP-005 rev C (Year: 2016).*

USCAR/EWCAP-005 rev G (Year: 2024).*

* cited by examiner

ELECTRICAL CONNECTOR MOUNTING

INTRODUCTION

The disclosure relates to electrical connections within vehicles, and may in particular relate to assemblies for ensuring proper mounting of electrical connectors.

Packaging envelopes for electric circuits supplying electric power to electric machines on vehicles can be limited. Implementation of large capacity electrical systems can be constrained by available packaging space. An example of a large capacity electrical circuit is an electric circuit conducting high voltage electric power between an inverter device and a traction motor. Known design factors of a large capacity electrical circuit include length and routing of high power electric cables based upon electrical energy losses, inductance and electrical noise generation, temperature management and dissipation, and accessibility for assembly and service.

Accordingly, it is desirable to provide new and improved methods and assemblies for mounting electrical connectors within vehicles. Furthermore, other desirable features and characteristics of the present disclosure will become apparent from the subsequent detailed description and the appended claims, taken in conjunction with the accompanying drawings and the foregoing technical field and background.

SUMMARY

In an embodiment, an electrical interconnection for a vehicle includes a barbed projection having a proximal end fixed to the vehicle, wherein the projection includes a distal end including outwardly extending barbs; an electrical connector having a selected mounting interface; and a universal connector mount including a body formed with a cavity and a corresponding mounting interface, wherein the distal end of the barbed projection is received within the cavity, wherein the barbs pierce the body, and wherein the selected mounting interface of the electrical connector is releasably connected to the corresponding mounting interface of the universal connector mount.

In certain embodiments of the electrical interconnection, the selected mounting interface of the electrical connector is selected from a group of regulated mounting interfaces, and the universal connector mount is selected from a group of universal connector mounts, each universal connector mount in the group is formed with the cavity, and each regulated mounting interface is provided on a respective universal connector mount within the group.

In certain embodiments of the electrical interconnection, the selected mounting interface is a clip slot and the corresponding mounting interface is a retainer clip.

In certain embodiments of the electrical interconnection, the electrical connector interconnects a first electrical wire and a second electrical wire.

In certain embodiments of the electrical interconnection, the barbed projection and the universal connector mount are press fit together.

In certain embodiments of the electrical interconnection, the barbed projection and the universal connector mount are permanently fixed together.

In certain embodiments of the electrical interconnection, the universal connector mount has a first surface and a second surface opposite the first surface, the cavity is formed on the first surface, and the corresponding mounting interface is formed on the second surface.

In another embodiment, an assembly for electrical interconnection for a vehicle includes a barbed projection having a proximal end configured for attachment to the vehicle, wherein the projection includes a distal end including outwardly extending barbs; an electrical connector configured to interconnect a first electrical wire and a second electrical wire of the vehicle, wherein the electrical connector has a selected mounting interface; and a lot of universal connector mounts, wherein each universal connector mount in the lot has a body formed with a cavity of a same design configured for receiving the distal end of the barbed projection in a press fit connection, wherein a first universal connector mount in the lot has a first corresponding mounting interface of a first design and a second universal connector mount in the lot has a second corresponding mounting interface of a second design different from the first design, wherein either the first corresponding mounting interface or the second corresponding mounting interface is configured for releasable connection to the selected mounting interface of the electrical connector.

In certain embodiments of the assembly, the barbs are configured to pierce the body of a selected universal connector mount to provide the press fit connection therebetween.

In certain embodiments of the assembly, the barbs are configured to pierce the body of a selected universal connector mount to permanently fix the barbed projection and the universal connector mount together.

In certain embodiments of the assembly, each universal connector mount has a first surface and a second surface opposite the first surface, the cavity is formed on the first surface, and each respective corresponding mounting interface is formed on the second surface.

In certain embodiments of the assembly, the selected mounting interface of the electrical connector is selected from a group of regulated mounting interfaces, and the universal connector mount is selected from a group of universal connector mounts, each universal connector mount in the group is formed with the cavity, and each regulated mounting interface is provided on a respective universal connector mount within the group.

In certain embodiments of the assembly, the selected mounting interface is a clip slot and each respective corresponding mounting interface is a retainer clip.

In certain embodiments of the assembly, a third universal connector mount in the lot has a third corresponding mounting interface of a third design, a fourth universal connector mount in the lot has a fourth corresponding mounting interface of a fourth design different, and the first design, second design, third design, and fourth design are different from one another.

In another embodiment, a method is provided for mounting an electrical interconnection to a vehicle. The method includes locating a projection on the vehicle; providing an electrical connector having a selected mounting interface; selecting a universal connector mount including a body formed with a cavity and a corresponding mounting interface, wherein the universal connector mount is selected based on a compatibility of the corresponding mounting interface with the selected mounting interface; fixing the universal connector mount to the vehicle by press fitting the projection into the cavity; and releasably connecting the electrical connector to the universal connector mount by engaging the selected mounting interface with the corresponding mounting interface.

In certain embodiments, the method further includes interconnecting a first electrical wire and a second electrical wire with the electrical connector.

In certain embodiments of the method, the projection is barbed, and fixing the universal connector mount to the vehicle by press fitting the projection into the cavity includes piercing the body of the universal connector mount with the projection.

In certain embodiments of the method, the selected mounting interface is a clip slot and the corresponding mounting interface is a retainer clip.

In certain embodiments of the method, the universal connector mount is selected from a lot of universal connector mounts, in each universal connector mount in the lot the cavity is formed with a same design configured for receiving the projection in a press fit connection, a first universal connector mount in the lot has a first corresponding mounting interface of a first design and a second universal connector mount in the lot has a second corresponding mounting interface of a second design different from the first design, either the first corresponding mounting interface or the second corresponding mounting interface is configured for releasable connection to the selected mounting interface of the electrical connector.

In certain embodiments of the method, a third universal connector mount in the lot has a third corresponding mounting interface of a third design, a fourth universal connector mount in the lot has a fourth corresponding mounting interface of a fourth design different, and the first design, second design, third design, and fourth design are different from one another.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses of embodiments herein. Furthermore, there is no intention to be bound by any expressed or implied theory presented in the preceding introduction, summary or the following detailed description. As used herein, the term “module” refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Embodiments herein provide for mounting electrical connectors to vehicles using both a press fit connection and a releasable connection. In certain embodiments, a universal connector mount includes a first end configured to be permanently fixed to a vehicle component such as a barbed projection. The universal connector mount includes a second end that is configured for releasable connection to the electrical connector. The universal connector mount and/or electrical connector may be selected for use with one another.

Figure 1:
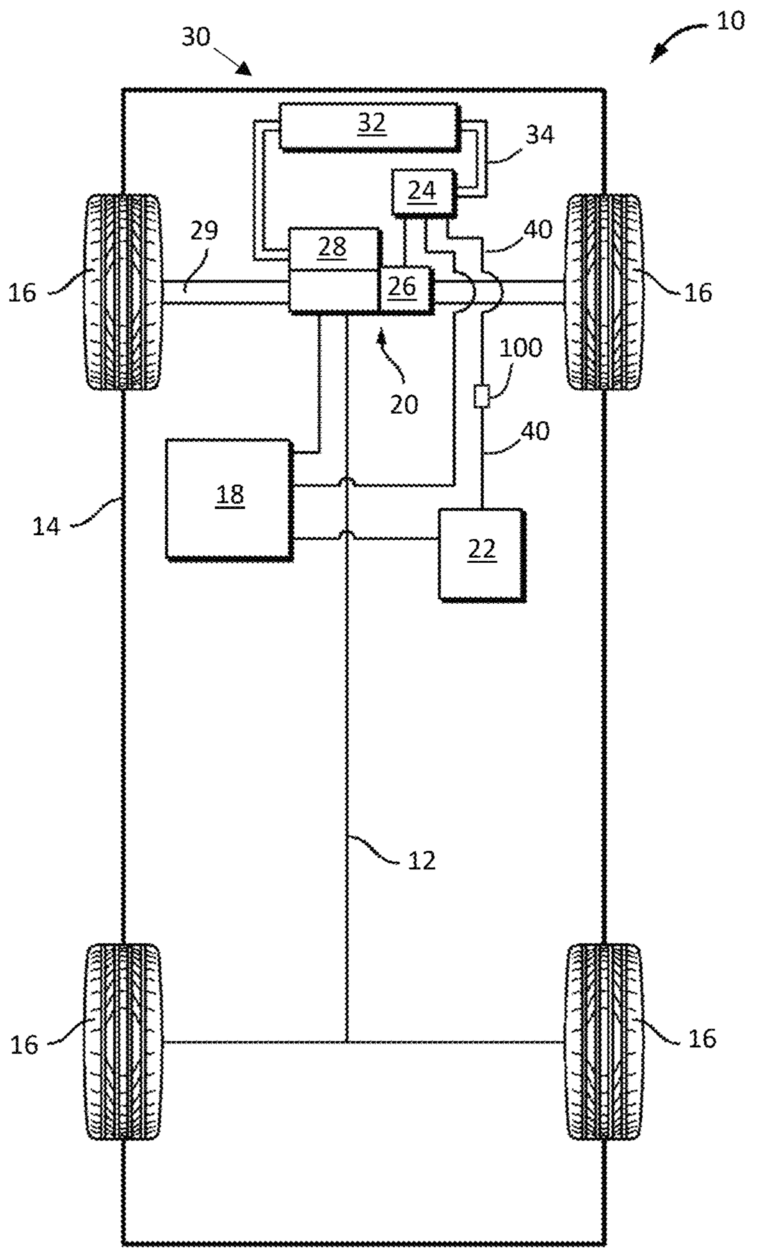
FIG. 1 is a schematic layout of a vehicle having an electrical interconnection in accordance with exemplary embodiments.

With reference to FIG. 1, certain features of a vehicle 10 are illustrated in functional block diagram form. In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

As depicted in FIG. 1, the exemplary vehicle 10 generally includes a chassis 12, a body 14, four wheels 16, and an electronic control system 18. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

In the exemplary embodiment illustrated in FIG. 1, the vehicle 10 includes an actuator assembly 20, a battery (or a DC power supply) 22, and a power converter assembly (e.g., an inverter or inverter assembly) 24. The actuator assembly 20 may include an electric motor/generator (or motor) 26 and/or a combustion engine 28.

Still referring to FIG. 1, the electric motor 26 and the combustion engine 28 are integrated such that one or both are mechanically coupled to at least some of the wheels 16 through one or more drive shafts 29.

The vehicle 10 further includes a thermal management system 30 having a radiator 32 and coolant circulation hoses 34. The radiator 32 may be connected to the frame at an outer portion thereof. The coolant circulation hoses 34 may provide multiple cooling channels that contain a cooling fluid (i.e., coolant) such as water and/or ethylene glycol (i.e., "antifreeze"). The coolant circulation hoses 34 may be coupled to the combustion engine 28 and/or the inverter 24. In certain embodiments, these components control the temperature of the battery 22, inverter 24, and motor 26 to provide optimal performance.

The electronic control system 18 is in operable communication with the actuator assembly 20, the high voltage battery 22, and the inverter 24. Although not shown in detail, the electronic control system 18 includes various sensors and automotive control modules, or electronic control units (ECUs), such as an inverter control module, a motor controller, and a vehicle controller, and at least one processor and/or a memory.

As shown, wires 40 provide for electrical communication between various components. Wires 40 are mounted to the vehicle 10 at various locations by an electrical interconnection 100.

Figure 2:
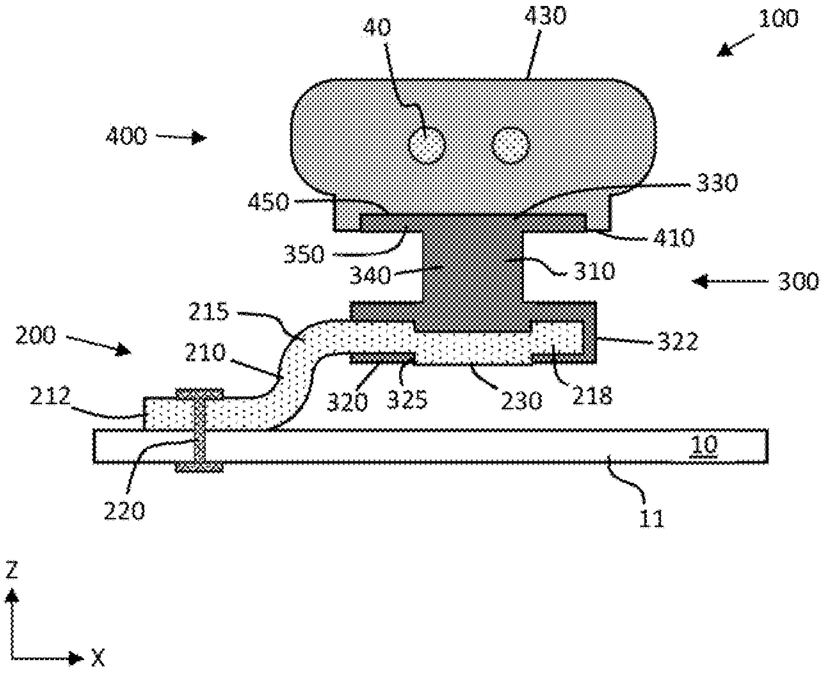
FIG. 2 is a cross-sectional view schematic of the electrical interconnection of FIG. 1 in accordance with exemplary embodiments.

Referring to FIG. 2, an exemplary electrical interconnection 100 is illustrated. As shown, the interconnection 100 may include the vehicle 10, a projection 200, an electrical connector 400, and a universal connector mount 300 interconnecting the projection 200 and the electrical connector 400.

In certain embodiments, the projection 200 is located on a bracket 210 that extends laterally in an X-direction from a first end 212 to a second end 218. At the first end 212, the bracket 210 is secured to a component 11 of the vehicle 10. The vehicle component 11 may be a body structure, an engine structure, a door panel, sheet metal, and/or any suitable vehicle location. A fastener 220 such as a bolt may be used to secure the bracket 210 to the vehicle component 11. In other embodiments, the bracket 210 or projection 200 may be welded or molded to the vehicle component 11. In certain embodiments, the projection 200 may be part of the vehicle component 11. An exemplary projection 200 is metal or other rigid material. As shown, the bracket 210 includes a shoulder portion 215 that extends in the Z-direction away from the vehicle component 11.

Figure 3:
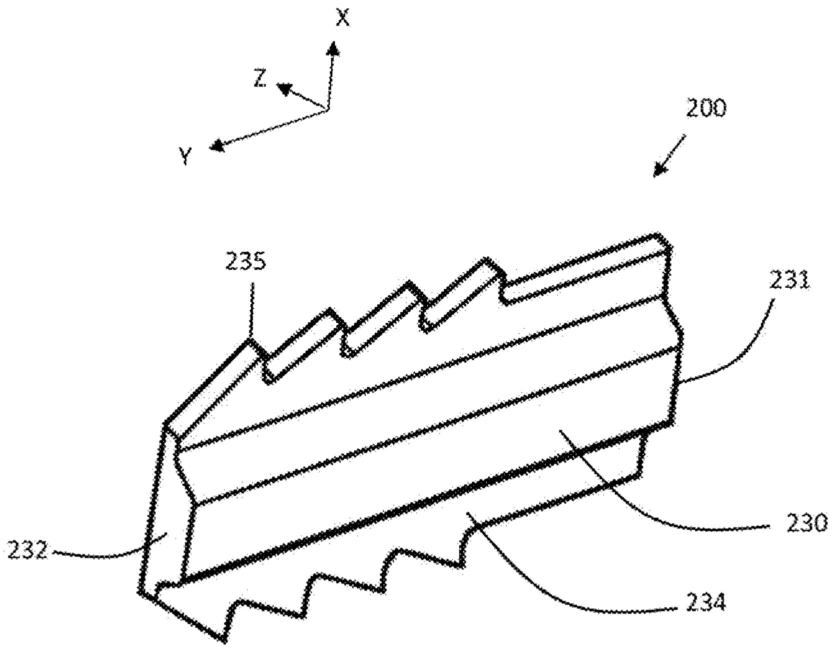
FIG. 3 is a perspective view schematic of a projection from the electrical interconnection of FIG. 2 in accordance with exemplary embodiments.

Cross-referencing FIGS. 2 and 3, at the distal or second end 218 of the bracket 210, the projection 200 extends longitudinally in a Y-direction perpendicular to the X-direction and to the Y-direction from a proximal end 231 to a distal end 232. As shown, the projection 200 may include a central rib 230 extending from the proximal end 231 to the distal end 232. Further, the projection 200 may have wing portions 234 extending away from the rib 230 in the X-direction. As shown, barbs 235 are formed on the wing portions 234 and extend away from the rib 230 in the X-direction to tips.

Figure 4:
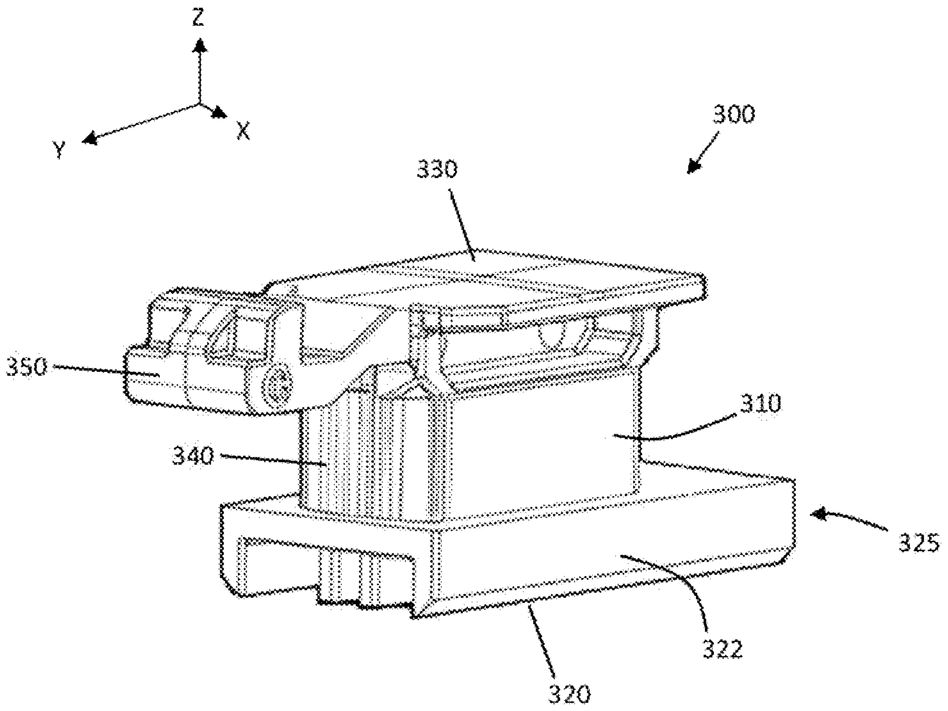
FIG. 4 is a perspective view schematic of a universal connector mount from the electrical interconnection of FIG. 2 in accordance with exemplary embodiments.

Cross-referencing FIGS. 2 and 4, the universal connector mount 300 includes a body 310 extending in the Z-direction from a bottom surface 320 to a top surface 330. At the bottom surface 320, the body 310 includes a platform 322 formed with a cavity 325. The cavity 325 extends in the Y-direction.

At the top surface 330, the universal connector mount 300 includes an engagement or mounting interface or feature 350. In the illustrated embodiment, the interface 350 is a retainer clip designed in accordance with United States Council for Automotive Research (USCAR) standards, i.e., a USCAR retainer clip.

As shown, the universal connector mount 300 includes a neck 340 connecting the platform 322 and the engagement interface 350.

Figure 5:
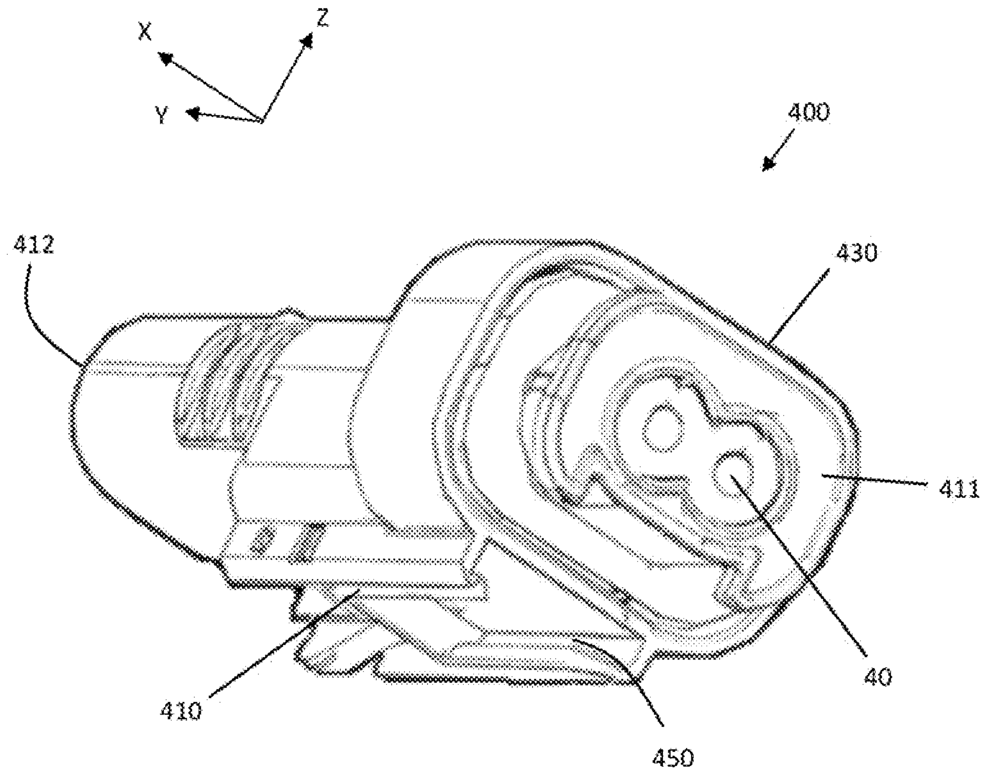
FIG. 5 is a perspective view schematic of an electrical connector from the electrical interconnection of FIG. 2 in accordance with exemplary embodiments.

Cross-referencing FIGS. 2 and 5, the electrical connector 400 provides for interconnection of wires 40 and may be or include a wire harness. The electrical connector 400 extends in the Y-direction from a first end 411 to a second end 412. Each end 411 and 412 may receive adjacent wires 40 for electrical interconnection. The electrical connector 400 includes a bottom surface 410 and extends in the Z-direction to a top surface 430. A mounting interface 450 is formed on or in the bottom surface 410. In the illustrated embodiment, the mounting interface 450 is an USCAR clip slot or cavity, configured to engage an USCAR retainer clip, such as interface 350 of the universal connector mount 300.

While FIGS. 2-5 indicate that an USCAR retainer clip is formed on the universal connector mount 300 and an USCAR clip slot is formed on the electrical connector 400, it is envisioned that an USCAR retainer clip be formed on the electrical connector 400 and an USCAR clip slot be formed on the universal connector mount 300. In either case, the universal connector mount 300 and electrical connector 400 are designed and formed for releasable connection.

Figure 6:
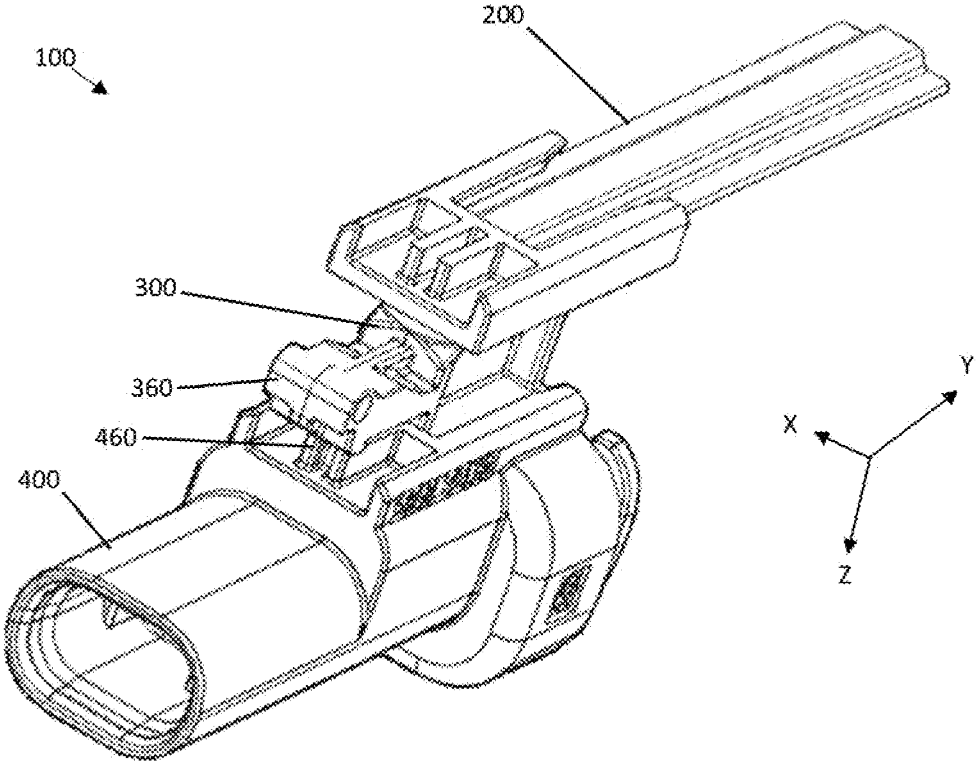
FIG. 6 is a perspective view schematic of the electrical interconnection of FIG. 2 in accordance with exemplary embodiments.
Figure 7:
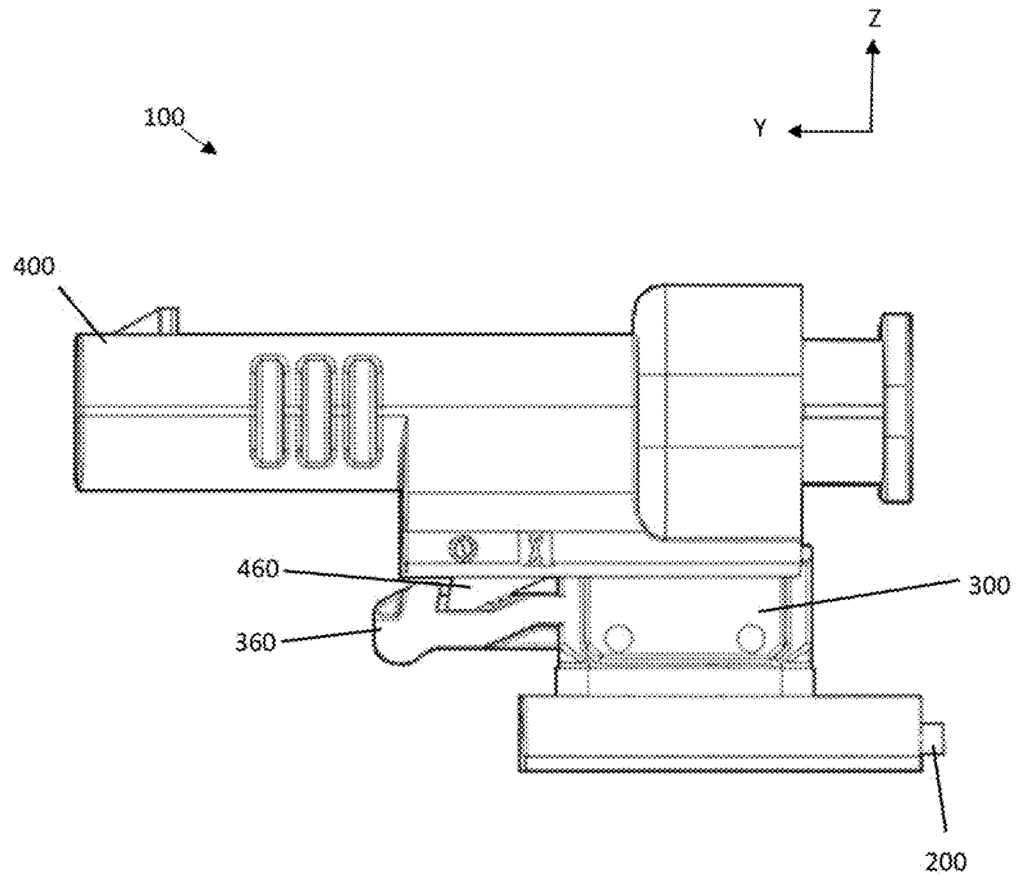
FIG. 7 is a side view schematic of the electrical interconnection of FIG. 2 in accordance with exemplary embodiments.

FIG. 6 is a perspective view of the electrical interconnection 100 showing the interconnection of the projection 200, universal connector mount 300, and electrical connector 400. FIG. 7 is a side view of the same assembly 100. Cross-referencing FIGS. 2-7, the projection 200 is connected to the universal connector mount 300 by advancing the distal end 232 into the cavity 325 in the Y-direction. The barbs 235 of the projection 200 contact and then pierce the body 310 of the universal connector mount 300. The angled surfaces of the barbs 235 allow for forward movement of the projection 200 into the cavity 325, but prevent withdrawal of the projection 200 from the cavity 325. As a result, the projection 200 may be press fit into the cavity 325 of the universal connector mount 300.

In certain embodiments, upon press fitting the projection 200 into the cavity 325, the projection 200 and universal connector mount 300 are permanently fixed together. As used herein, the term "permanently fixed" means fixed in a manner such that the universal connector mount 300 and the barbed projection 200 cannot be separated without damaging the universal connector mount 300 and/or, if removed, the universal connector mount 300 cannot be re-fixed to the barbed projection 200.

On the other hand, the connection between the universal connector mount 300 and the electrical connector 400 is releasable without damage to the components. For example, the interface 350 of the universal connector mount 300 may include a retractable hook 360 and the interface 450 of the electrical connector 400 may include a catch 460 that engage when the interfaces 350 and 450 are engaged, i.e., such as by sliding a retainer clip into a clip slot. The interfaces 350 and 450 may be disengaged by pressing the hook 360 away from engagement with the catch 460 and sliding the universal connector mount 300 and the electrical connector 400 away from one another. Other connection, engagement, and release features may be used.

Figure 8:
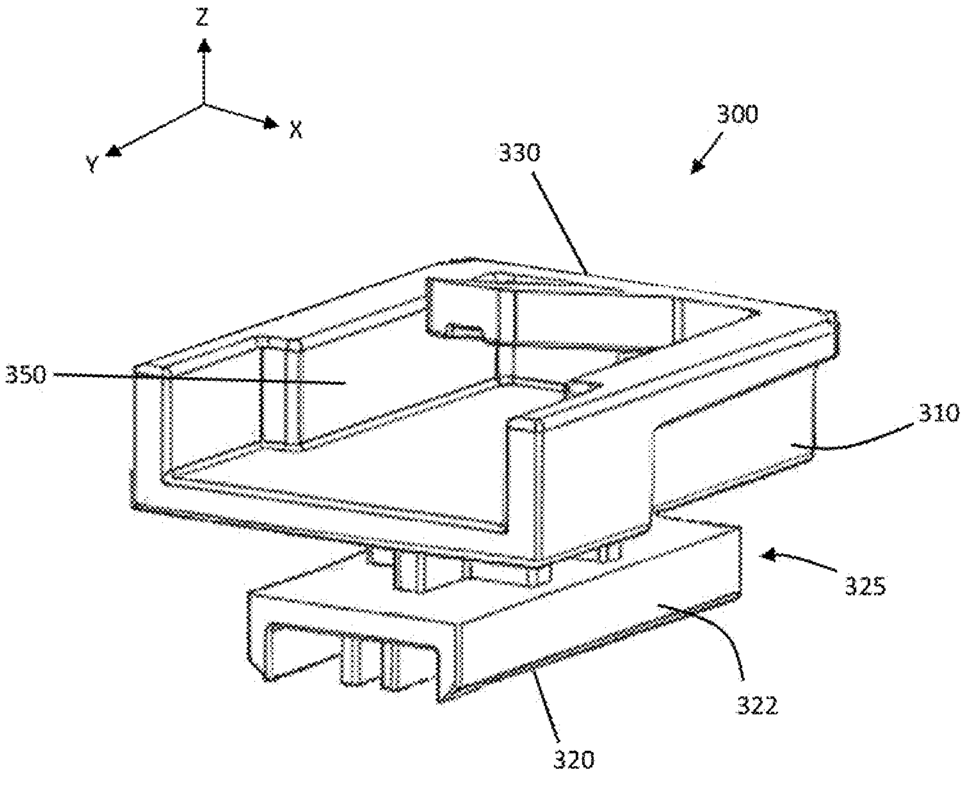
FIG. 8 is a perspective view schematic of another universal connector mount from the electrical interconnection of FIG. 2 in accordance with exemplary embodiments.

For example, FIG. 8 illustrates an alternative design of a universal connector mount 300 having a different interface 350.

FIGS. 4 and 8 illustrate two embodiments of interfaces 350 that comply with the United States Council for Automotive Research (USCAR) standards. It is contemplated herein that the interfaces 350 and 450 may be designed in compliance with any of the approved USCAR standard clip slot and retainer clip designs.

Figure 9:
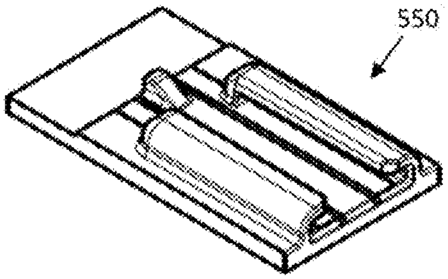
Prior Art FIG. 9
FIGS. 9-12 are perspective view schematics of various mounting interfaces for use in the universal connector mount and/or electrical connector of FIG. 2 in accordance with exemplary embodiments.
Figure 10:
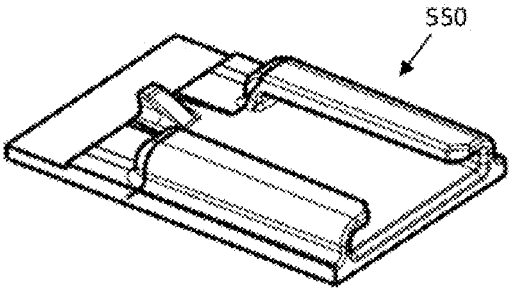
Prior Art FIG. 10
Figure 11:
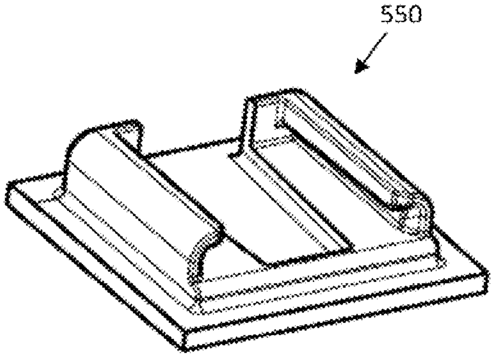
Prior Art FIG. 11
Figure 12:
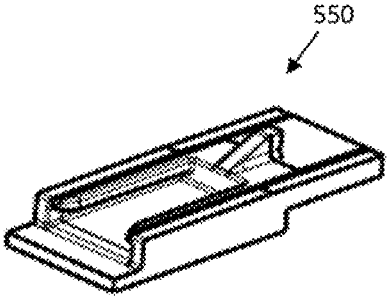
Prior Art FIG. 12
Figure 13:
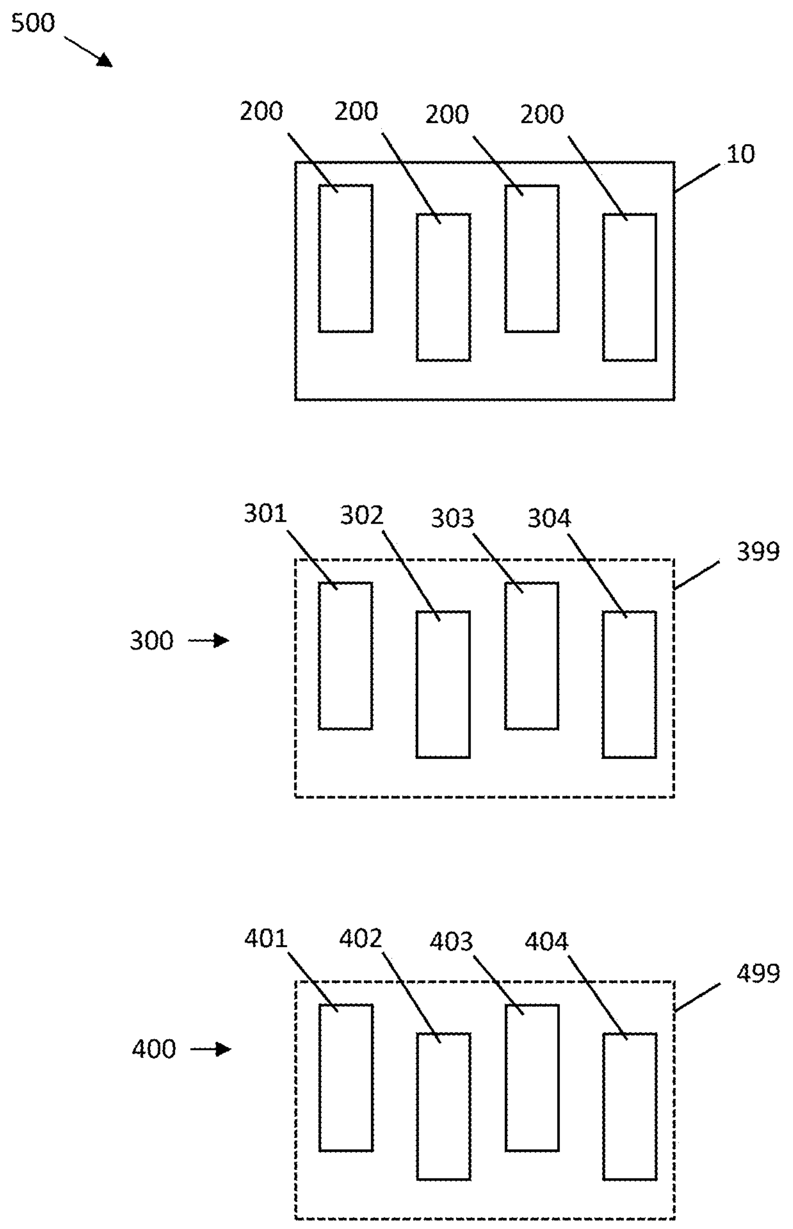
FIG. 13 is a schematic of an assembly for the electrical interconnection of FIG. 2 in accordance with exemplary embodiments.

United States Council for Automotive Research (USCAR) provides for several standardized clip slot and retainer clip designs. For example, USCAR standards include the 11 mm clip slot 550 of FIG. 9, the 17 mm clip slot 550 of FIG. 10, the 23 mm clip slot 550 of FIG. 11, and the 7 mm clip slot 550 of FIG. 12. Any of these or other designs may be used to provide releasable connection between the universal connector mount 300 and electrical connector 400.

The embodiments of FIGS. 1-8 allow for releasably mounting electrical connectors 400 to a vehicle 10 while still utilizing press fit, permanent, connections to the vehicle 10. The universal connector mount 300 is formed with a cavity for receiving and holding the barbed projection 200 permanently. Further, the universal connector mount 300 is formed with a clip slot or cavity with dimensions for receiving the retainer clip of the electrical connector 400. Alternatively, the electrical connector 400 is formed with a clip slot or cavity with dimensions for receiving the retainer clip of the universal connector mount 300.

In certain embodiments, the electrical interconnection 100 for vehicle 10 includes a barbed projection 200 having a proximal end 231 fixed to the vehicle 10. The projection 200 includes a distal end 232 including outwardly extending barbs 235.

The electrical interconnection 100 further includes an electrical connector 400 configured to interconnect first and second electrical wires 40. The electrical connector 400 has a selected mounting interface 450.

The electrical interconnection 100 further includes a universal connector mount 300 comprising a body 310 formed with a cavity 325 and a corresponding mounting interface 350, wherein the distal end 232 of the barbed projection 200 is received within the cavity 325, wherein the barbs 235 pierce the body 310, and wherein the selected mounting interface 450 of the electrical connector 400 is releasably connected to the corresponding mounting interface 350 of the universal connector mount 300.

In certain embodiments, the electrical interconnection 100 for vehicle 10 is provided as an assembly 500. For example, the assembly 500 may include each component 200, 300, and 400 before interconnection. Each barbed projection 200 may have a proximal end 231 configured for attachment to the vehicle 10 and a distal end 232 including outwardly extending barbs 235.

Further, a plurality of components 300 and 400 may be provided in the assembly 500. For example, a lot 399 of universal connector mounts 300 may be provided and a lot 499 of electrical connectors 400 may be provided.

In the lot 499 of electrical connectors 400, each electrical connector 400 is configured to interconnect electrical wires of the vehicle 10, Each electrical connector 400 has a selected mounting interface 450. Each selected mounting interface 450 of the electrical connectors 400 is selected from a group of regulated mounting interfaces, such as USCAR interfaces. For example, a first electrical connector 401 in the lot 499 has a first selected mounting interface 450 of a first design, a second electrical connector 402 in the lot 499 has a second selected mounting interface 450 of a second design, a third electrical connector 403 in the lot 499 has a third selected mounting interface 450 of a third design, a fourth electrical connector 404 in the lot 499 has a fourth selected mounting interface 450 of a fourth design. The selected mounting interfaces 450 of the electrical connectors 401, 402, 403, and 404 are different from one another. For example, each of the selected mounting interfaces 450 may be one of the clip slots 550 of FIGS. 9-12 or may correspond and mate with one of the clip slots 550 of FIGS. 9-12, i.e., be a retainer clip.

In the lot 399 of universal connector mounts 300, each universal connector mount 300 has a body 310 formed with a cavity 325 of a same design configured for receiving the distal end of the barbed projection 200 in a press fit connection. A first universal connector mount 301 in the lot 399 has a first corresponding mounting interface 350 of a first design, a second universal connector mount 302 in the lot 399 has a second corresponding mounting interface 350 of a second design different from the first design, a third universal connector mount 303 in the lot 399 has a third corresponding mounting interface 350 of a third design different from the first design and second design, and a fourth universal connector mount 304 in the lot 399 has a fourth corresponding mounting interface 350 of a fourth design different from the first design, second design, and third design. In exemplary embodiments, the corresponding mounting interface of one of the universal connector mount 301, 302, 303, and 304 is configured for releasable connection to the selected mounting interface 450 of the selected electrical connector 400. For example, each of the corresponding mounting interfaces 350 may be one of the clip slots 550 of FIGS. 9-12 or may correspond and mate with one of the clip slots 550 of FIGS. 9-12, i.e., be a retainer clip.

Figure 14:
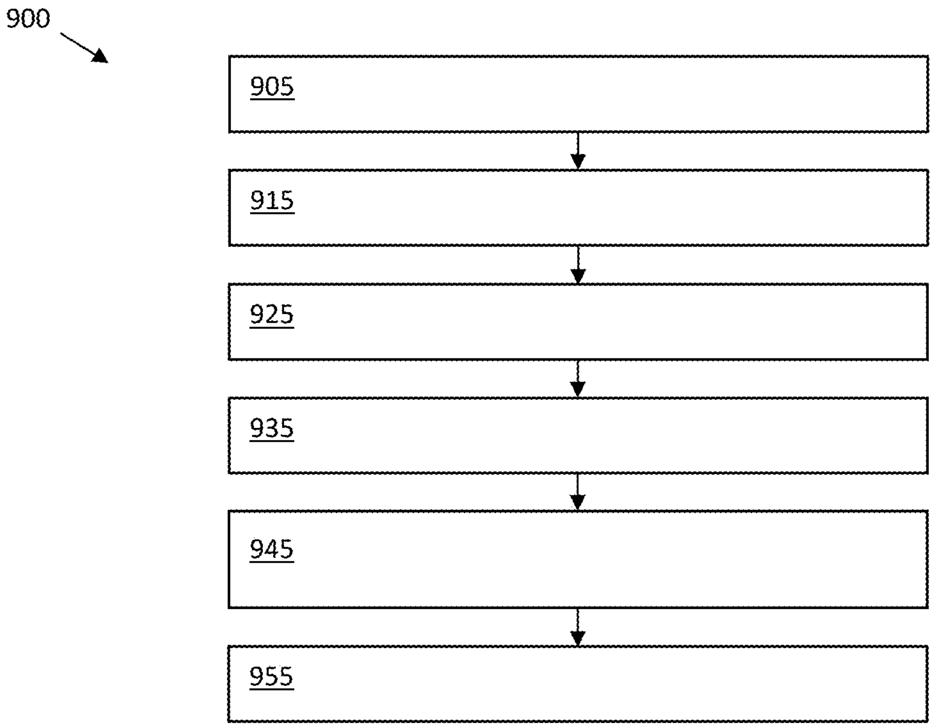
FIG. 14 is a flow chart illustrating a method for mounting an electrical interconnection to a vehicle in accordance with certain embodiments.

Referring now to FIG. 14, a flow chart of a method 900 for mounting an electrical interconnection to a vehicle is provided. As shown, method 900 includes, at operation 905, locating a projection 200 on the vehicle 10. Locating the projection 200 on the vehicle 10 may include forming the projection 200 and/or mounting the projection 200 on the vehicle 10.

Further, method 900 may include, at operation 915, providing an electrical connector 400 having a selected mounting interface 450. In certain embodiments, the electrical connector 400 may be selected from a lot 499 of electrical connectors of various designs. In other embodiments, the electrical connector 400 may be pre-selected, and/or may be present in the vehicle 10 and installed to interconnect wires 40 therein.

Method 900 may continue at operation 925 with selecting a universal connector mount 300 with a corresponding mounting interface 350. Selection of the universal connector mount 300 may be based on a compatibility of the corresponding mounting interface 350 with the selected mounting interface 450. In certain embodiments, the universal connector mount 300 is selected from a lot 399 of universal connector mounts 300.

As shown, method 900 may include fixing the universal connector mount 300 to the vehicle 10 at operation 935. Operation 935 may include press fitting the projection 200 into the cavity 325. Press fitting the projection 200 into the cavity 325 may include piercing the body 310 of the universal connector mount 300 with the projection 200.

Further, method 900 may include at operation 945 releasably connecting the electrical connector 400 to the universal connector mount 300. For example, operation 945 may include engaging the selected mounting interface 450 with the corresponding mounting interface 350.

Method 900 may also include interconnecting a first electrical wire 40 and a second electrical wire 40 with the electrical connector 400 at operation 955. As noted above, in certain embodiments, the wires 40 may already be interconnected at the electrical connector 400.

While FIG. 14 illustrates a sequential order of operations, it is noted that the method 900 is not limited to such a sequential order and that the operations may be performed in any suitable logical order.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electrical interconnection for a vehicle comprising:

a barbed projection having a proximal end fixed to the vehicle and a distal end, wherein:

the barbed projection comprises a central rib extending along a longitudinal direction from the proximal end to the distal end and having a first lateral extent;

the barbed projection comprises a pair of wing portions extending away from one another along a lateral direction and outward from the central rib beyond the first lateral extent;

the barbed projection includes outwardly extending barbs formed on the pair of wing portions and extending laterally outward from the wing portions to tips; and the central rib is free of barbs;

an electrical connector having a selected mounting interface; and a connector mount comprising a body having a first surface and a second surface opposite the first surface, the body formed with a cavity on the first surface and a corresponding mounting interface on the second surface, wherein the distal end of the barbed projection is received within the cavity, wherein the barbs pierce the body, and wherein the selected mounting interface of the electrical connector is releasably connected to the corresponding mounting interface of the connector mount.

2. The electrical interconnection of claim 1, wherein the wing portions are enclosed by the body on opposed sides thereof, and wherein the central rib extends along an exterior of the body.

3. The electrical interconnection of claim 1, wherein the barbs comprise angled surfaces that permit advancement of the distal end into the cavity in a first direction and prevent withdrawal of the distal end from the cavity in a second direction opposite the first direction.

4. The electrical interconnection of claim 1, wherein the central rib extends from the pair of wing portions in a third direction perpendicular to both the longitudinal direction and the lateral direction.

5. The electrical interconnection of claim 1, wherein the central rib has a thickness in a third direction perpendicular to both the longitudinal direction and the lateral direction, the wing portions have a thickness in the third direction, and the thickness of the central rib in the third direction is greater than the thickness of the wing portions in the third direction.

6. The electrical interconnection of claim 1, wherein the central rib has a first width in the lateral direction, and wherein the wing portions extend from the central rib in the lateral direction by a distance greater than the first width.

7. The electrical interconnection of claim 1, further comprising a bracket having a first end fixed to the vehicle and a second end to which the proximal end of the barbed projection is fixed, wherein the bracket comprises a shoulder portion such that the proximal end of the barbed projection is offset from the first end of the bracket in two perpendicular directions.

8. An assembly for electrical interconnection for a vehicle comprising:

a barbed projection having a proximal end configured for attachment to the vehicle, wherein:

the barbed projection includes a distal end;

the barbed projection comprises a central rib extending along a longitudinal direction from the proximal end to the distal end and having a first lateral extent;

the barbed projection comprises a pair of wing portions extending away from one another along a lateral direction and outward from the central rib beyond the first lateral extent;

the barbed projection includes outwardly extending barbs formed on the pair of wing portions and extending laterally outward from the wing portions to tips;

the central rib extends from the pair of wing portions in a transverse direction perpendicular to both the longitudinal direction and the lateral direction; and the central rib is free of barbs;

an electrical connector configured to interconnect a first electrical wire and a second electrical wire of the vehicle, wherein the electrical connector has a selected mounting interface; and a lot of connector mounts, wherein a body of a connector mount in the lot has a first surface and a second surface opposite the first surface and is formed with a cavity on the first surface of a same design configured for receiving the distal end of the barbed projection in a press fit connection such that the wing portions are enclosed by the body on opposed sides thereof and the central rib extends along an exterior of the body, wherein a first connector mount in the lot has a first corresponding mounting interface of a first design on the second surface and a second connector mount in the lot has a second corresponding mounting interface of a second design on the second surface different from the first design, wherein either the first corresponding mounting interface or the second corresponding mounting interface is configured for releasable connection to the selected mounting interface of the electrical connector.

9. The assembly of claim 8, wherein the barbed projection comprises metal and the body comprises plastic.

10. The assembly of claim 8, wherein the outwardly extending barbs comprise a plurality of pairs of barbs, each pair comprising a first barb on a first wing portion of the pair of wing portions and a second barb on a second wing portion of the pair of wing portions, the first barb and the second barb of each pair positioned at a common longitudinal position along the central rib, the plurality of pairs of barbs spaced from one another along the longitudinal direction, and wherein each of the outwardly extending barbs has a tip extending along a line parallel to the longitudinal direction.

11. The assembly of claim 8, wherein each of the outwardly extending barbs has a tip that faces toward the proximal end of the barbed projection, such that advancement of the distal end into the cavity in an insertion direction is permitted and withdrawal of the distal end from the cavity in a direction opposite the insertion direction is prevented.

12. The assembly of claim 8, wherein the cavity has a cross-section corresponding to a cross-section of the barbed projection, the cross-section of the cavity comprising a first portion configured to receive the central rib and a second portion configured to receive the pair of wing portions.

13. The assembly of claim 8, wherein the pair of wing portions extend along the central rib from the proximal end to the distal end.

14. The assembly of claim 8, wherein the body further comprises a platform on the first surface, a neck extending from the platform in a direction toward the second surface, and a head at the second surface comprising one of the first corresponding mounting interface and the second corresponding mounting interface, wherein the neck has a lateral dimension less than a lateral dimension of the platform and less than a lateral dimension of the head.

15. A method for mounting an electrical interconnection to a vehicle, the method comprising:

locating a barbed projection on the vehicle, the barbed projection having a proximal end fixed to the vehicle and a distal end, the barbed projection comprising a central rib extending along a longitudinal direction from the proximal end to the distal end and having a first lateral extent, and a pair of wing portions extending away from one another along a lateral direction and outward from the central rib beyond the first lateral extent, wherein the barbed projection includes outwardly extending barbs formed on the pair of wing portions and extending laterally outward from the wing portions to tips, wherein the central rib extends from the pair of wing portions in a transverse direction perpendicular to both a longitudinal direction of the central rib and a lateral direction in which the wing portions extend from the central rib, and wherein the central rib is free of barbs;

providing an electrical connector having a selected mounting interface;

selecting a connector mount comprising a body having a first surface and a second surface opposite the first surface, the body formed with a cavity on the first surface and a corresponding mounting interface on the second surface, wherein the connector mount is selected based on a compatibility of the corresponding mounting interface with the selected mounting interface;

fixing the connector mount to the vehicle by press fitting the distal end of the barbed projection into the cavity such that the barbs pierce the body of the connector mount, the wing portions are enclosed by the body on opposed sides thereof, and the central rib extends along an exterior of the body; and releasably connecting the electrical connector to the connector mount by engaging the selected mounting interface with the corresponding mounting interface.

16. The method of claim 15, wherein locating the barbed projection on the vehicle comprises fixing a first end of a bracket to the vehicle, the bracket having the first end, a second end opposite the first end, and a shoulder portion intermediate the first end and the second end, wherein the proximal end of the barbed projection is fixed to the second end of the bracket such that the proximal end of the barbed projection is offset from the first end of the bracket in two perpendicular directions.

17. The method of claim 15, wherein selecting the connector mount comprises selecting the connector mount from a lot of connector mounts, wherein in each connector mount in the lot the cavity is formed with a same design configured for receiving the distal end of the barbed projection in a press fit connection, wherein a first connector mount in the lot has a first corresponding mounting interface of a first design and a second connector mount in the lot has a second corresponding mounting interface of a second design different from the first design, and wherein selecting the connector mount comprises selecting between the first connector mount and the second connector mount based on the selected mounting interface of the electrical connector.

18. The method of claim 15, wherein the outwardly extending barbs comprise a plurality of pairs of barbs, each pair comprising a first barb on a first wing portion of the pair of wing portions and a second barb on a second wing portion of the pair of wing portions, the first barb and the second barb of each pair positioned at a common longitudinal position along the central rib, the plurality of pairs of barbs spaced from one another along the longitudinal direction, and wherein each of the outwardly extending barbs has a tip extending along a line parallel to the longitudinal direction.

19. The method of claim 15, wherein press fitting the distal end of the barbed projection into the cavity comprises advancing the distal end into the cavity in a first direction such that angled surfaces of the barbs progressively displace material of the body of the connector mount, and wherein, after press fitting, the displaced material engages the barbs to prevent withdrawal of the distal end from the cavity in a second direction opposite the first direction.

20. The method of claim 15, wherein the barbed projection comprises metal and the body of the connector mount comprises plastic, and wherein press fitting the distal end of the barbed projection into the cavity comprises piercing the plastic of the body with the metal of the barbs.

* * * * *